Oct. 4, 1966    D. E. FELKER ETAL    3,276,854
METHOD AND APPARATUS FOR ASSEMBLING WIRES
IN A PLURALITY OF APERTURED PARTS
Filed Nov. 5, 1963    6 Sheets-Sheet 1
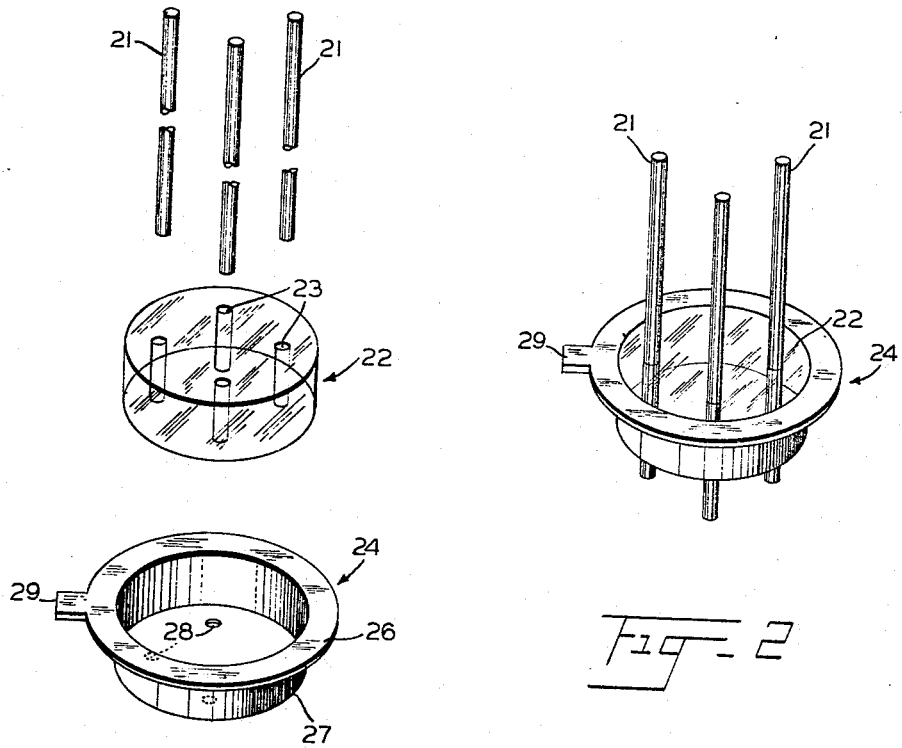
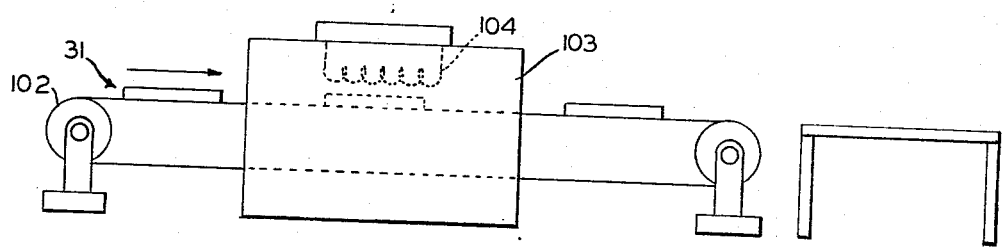
INVENTORS
D.E. FELKER
G.S. FOWLER
By R. P. Miller
ATTORNEY Oct. 4, 1966

D. E. FELKER ETAL 3,276,854

METHOD AND APPARATUS FOR ASSEMBLING WIRES
IN A PLURALITY OF APERTURED PARTS

Filed Nov. 5, 1963

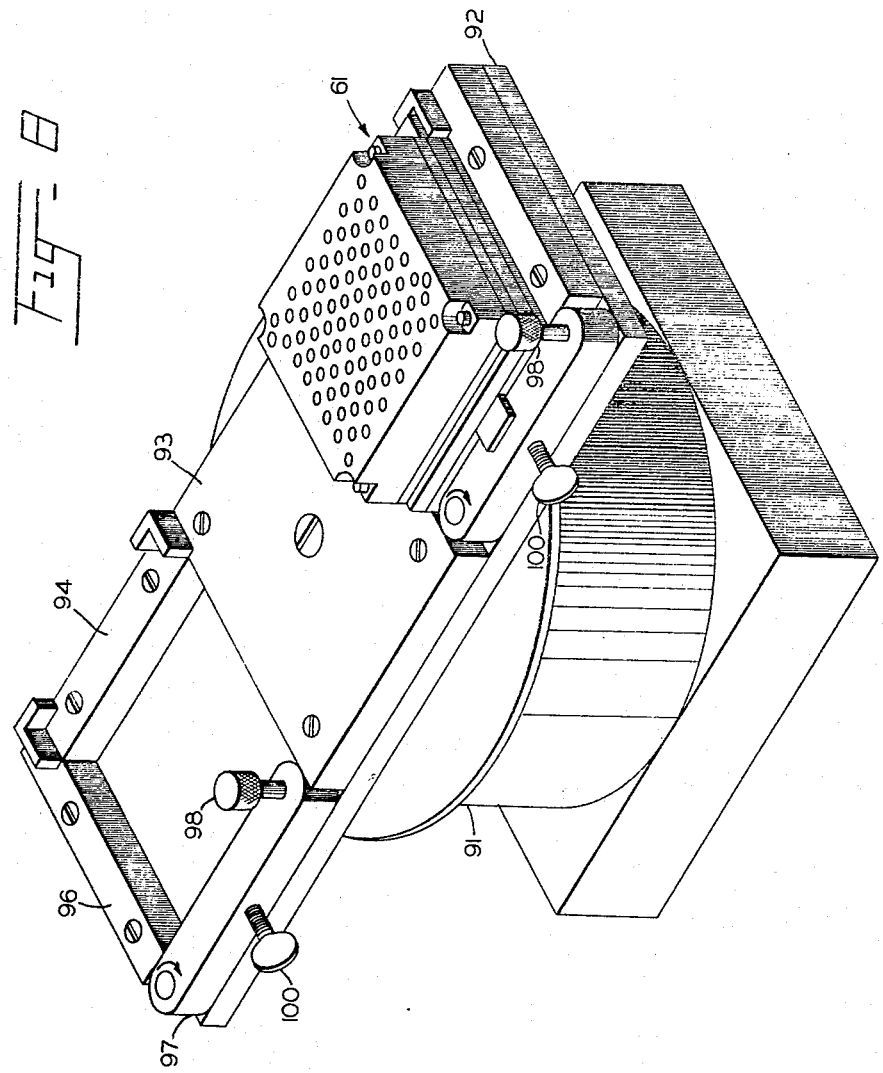

Oct. 4, 1966

D. E. FELKER ETAL 3,276,854

METHOD AND APPARATUS FOR ASSEMBLING WIRES
IN A PLURALITY OF APERTURED PARTS

Filed Nov. 5, 1963

United States Patent Office 3,276,854
Patented Oct. 4, 1966

3,276,854
METHOD AND APPARATUS FOR ASSEMBLING WIRES IN A PLURALITY OF APERTURED PARTS
David E. Felker, Allentown, and Glenn S. Fowler, Bethlehem, Pa., assignors to Western Electric Company, Incorporated, New York, N.Y., a corporation of New York
Filed Nov. 5, 1963, Ser. No. 321,459
9 Claims. (Cl. 65—59)

This invention relates to a method and apparatus for assembling wires in a plurality of apertured parts and, more particularly, to a method and apparatus for vibrating a bundle of wires and a first apertured part over a second apertured part to move an array of wires through the apertures formed in the parts.

In the assembly of small electronic components, such as transistors, it is necessary to pass a number of lead, or support, wires through geometrically similar arrays of holes formed in a number of parts. The usual practice is to manually thread the wires through the apertured parts. Obviously, such a procedure is time consuming, costly and tedious, requiring extreme dexterity on the part of operators.

An object of the invention resides in a new and improved method and the apparatus for assembling wires in a plurality of apertured parts.

A further object of the invention is an improved method and apparatus for vibrating two parts relative to a third part to assemble one of the parts through the other two parts.

Another object of the invention is the provision of a method and apparatus for vibrating a bundle of wires to move relative to a vibrating and moving apertured part and a fixed apertured part to pass an array of wires through the apertured parts.

An additional object of the invention resides in a fixture which may be first vibrated to orient first apertured cup-shaped parts and then subsequently vibrated to load second parts into the cup-shaped parts, whereafter the fixture is vibrated in conjunction with a second fixture holding bundles of wires so that arrays of wires are passed through both apertured parts.

With these and other objects in view, the present invention contemplates a method and apparatus for vibrating apertured parts such as transistor header platforms and glass preforms with respect to bundles of other parts, such as, wires to effectuate an assembly of the other parts through the apertured parts. More particularly, cup-shaped transistor header platforms are placed on a first ceramic fixture which is subjected to vibrations that function to orient the platforms in recesses formed in the fixture. Next, the glass preforms are placed on the fixture and the fixture is again subjected to vibrations which function to move the preforms within the cup-shaped portions of the platforms.

A second fixture having a plate with an array of holes corresponding to the array of apertures in the platforms is loaded with bundles of wires so that the ends of the wires abut the plate. This second fixture is placed on the first fixture and both fixtures are subjected to vibrations. The vibration causes the preforms to rotate within cup-shaped portions of the platforms and the ends of the wires are moved over the face of the apertured plate. One or more of the wires will initially move through the apertured plate to engage the upper surface of the rotating preform. Subsequently, the wire, or wires, engaging the rotating preforms will be aligned with the apertures formed therein and thus pass through the preforms into the apertures formed in the stationary platforms.

The ceramic fixture may now be advanced through a suitable furnace to fuse the glass preform and thus bond the wires to the platforms.

Other objects and advantages of the present invention will be apparent from the following detailed description when considered in conjunction with the accompanying drawings wherein:

FIG. 1 is an exploded perspective view of wires, a glass preform and a transistor header platform that are to be assembled by the method and apparatus of the present invention;

FIG. 2 is a view of the components shown in FIG. 1, after an assembling operation;

FIG. 8 illustrates a vibratory apparatus for simultaneously vibrating a pair of assembling fixtures of the type shown in FIG. 5;

FIG. 12 illustrates a typical furnace for fusing glass preforms to the wires and header platforms.

Figure 3:
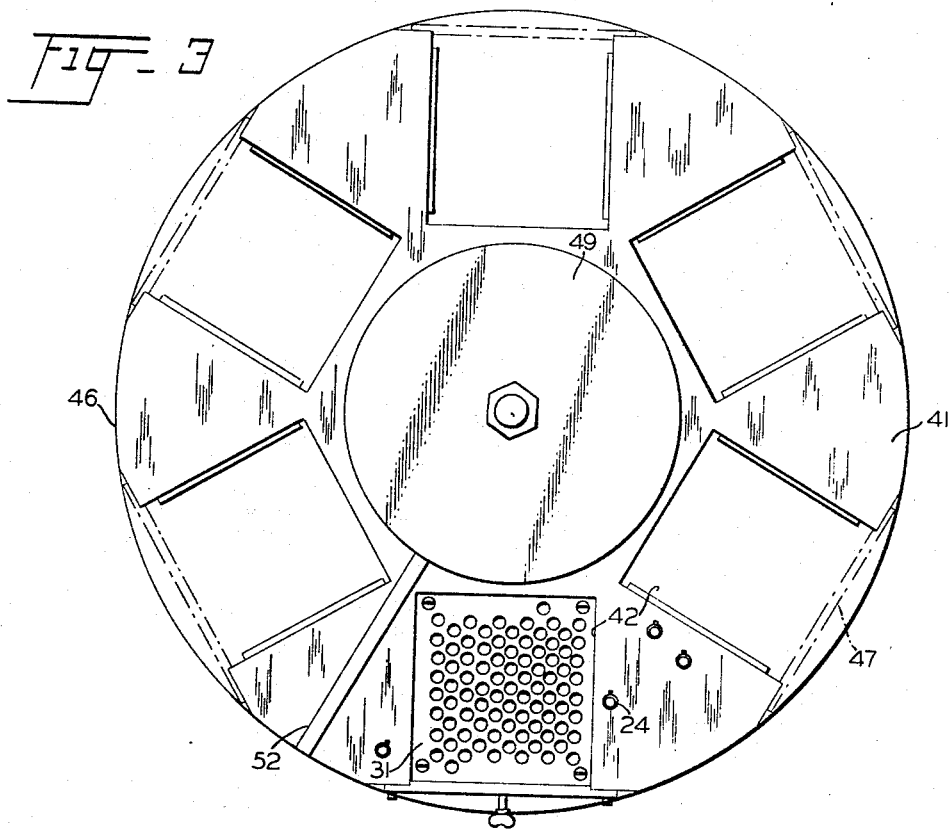
FIG. 3 is a plan view of a vibratory apparatus for loading transistor header platforms and glass preforms in a ceramic fixture.

One of the sub-assemblies included in a transistor is known as a header assembly and it comprises an array of three wires 21 (see FIGS. 1 and 2), a glass preform 22 having four apertures 23 and a header platform 24. The platform 24 includes a flange 26 and a cup-shaped, or depending, portion 27 in which three apertures or holes 28 are formed. The flange 26 is provided with a projection 29. In FIG. 2, the components 21, 22 and 24 are shown in an assembled position wherein the preform 22 is fused to both the wires 21 and to the platform 24.

Figure 5:
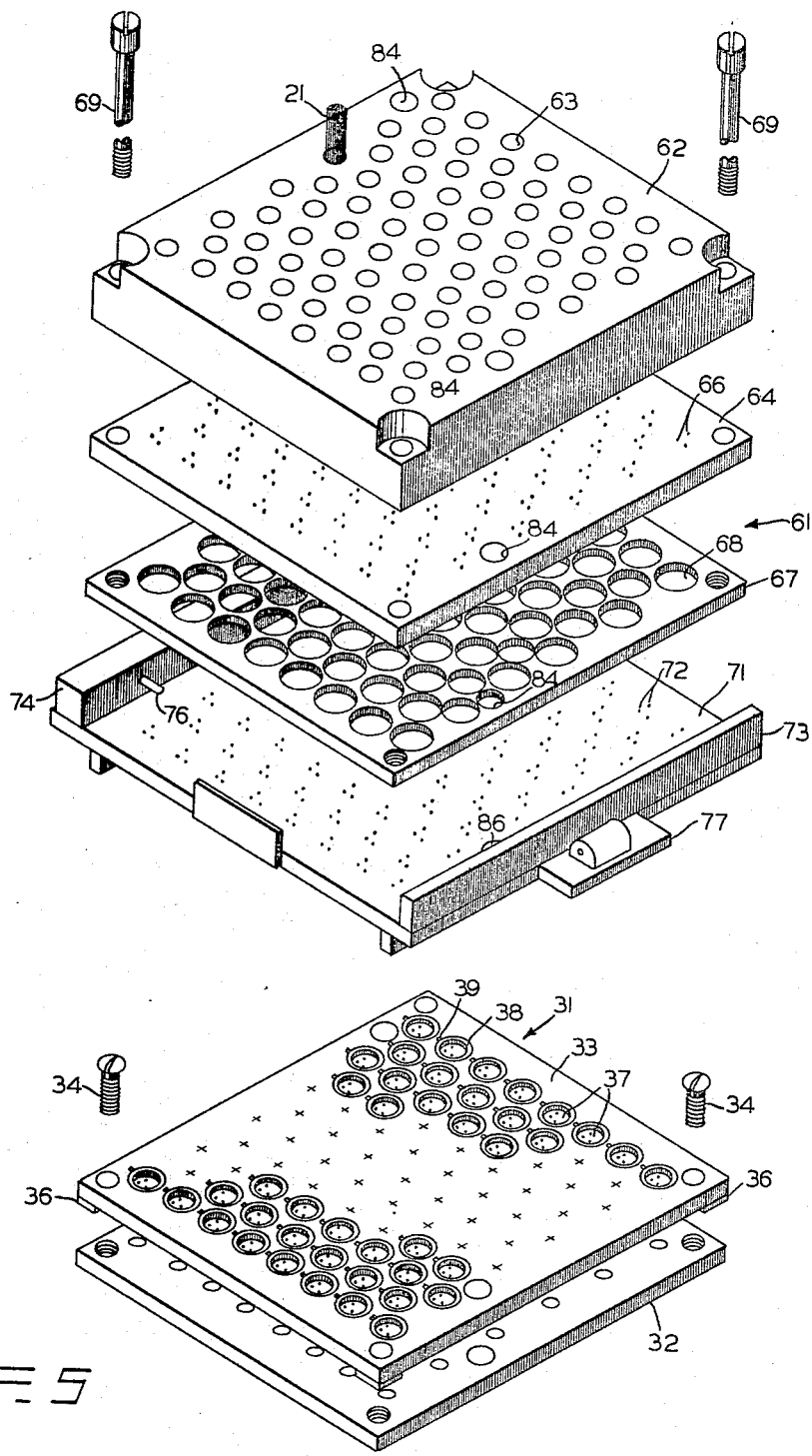
FIG. 5 is an exploded perspective view of the ceramic fixture in conjunction with a second fixture for receiving bundles of wires embodying features of the present invention.

Referring now to the lower portion of FIG. 5, there is shown a ceramic fixture 31 comprising a lower plate 32 and an upper plate 33 connected by screws 34. Spacers 36 are interposed between the plates 33 and 32. The plate 33 contains rows of recesses 37 for receiving the cup-shaped portions 27 of the header platforms 24. The recesses 37 extend outwardly to provide peripheral shelves 38 to support the flanges 26 of the platforms 24. The recesses are also provided with notches 39 to receive the projections 29 to thus hold the platforms 24 in an oriented position within the ceramic plate 31.

Figure 4:
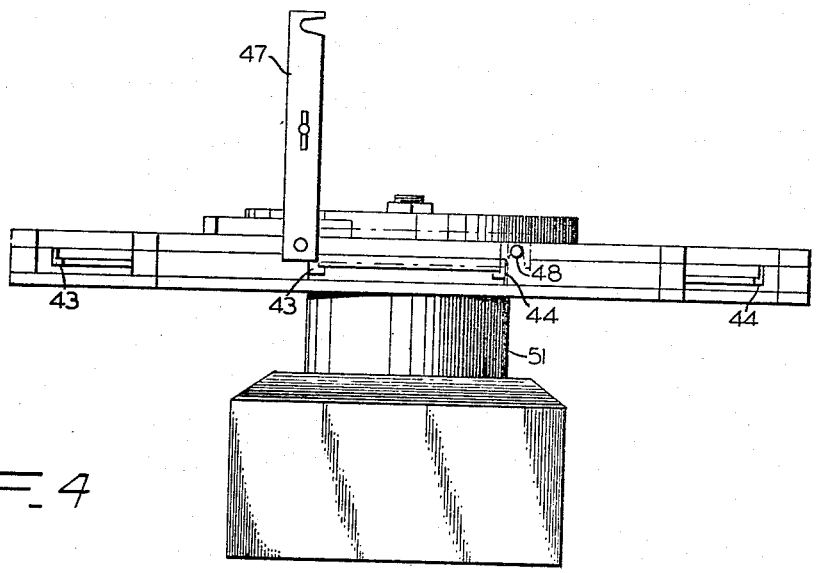
FIG. 4 is a side elevation view of the apparatus shown in FIG. 3 showing a vibratory unit and facilities for loading a ceramic fixture in the vibratory apparatus.

Attention is directed to FIGS. 3 and 4 wherein a plurality of ceramic fixtures 31 are shown loaded in a table top 41. The table top 41 is provided with openings 42 and depending guideways 43 and 44 for receiving and supporting each ceramic fixture 31. An intermittent rim 46 extends around a portion of the periphery of the table 41. In between each pair of rim sections 46 a gate 47 is pivotally mounted on the table. When the gate 47 is pivoted into the horizontal position to engage a holding pin 48, a continuous rim is formed around table top 41. The table top 41 is provided with a hub 49 that is mounted on springs (not shown) contained within a conventional rotary type vibratory unit 51. The vibratory unit 51 may be of the type sold under the trade name "Syntron," wherein an electromagnet twists the hub 49 against the action of springs whereafter the release of the magnet allows the springs to kick the hub back to the original position. When the hub 49 is kicked back to the original position, any parts positioned on the table top 41 will be thrust in a forward direction.

Figure 6:
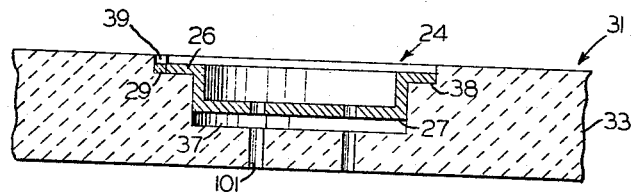
FIGS. 6 and 7 show a partial section of the ceramic fixture and two possible positions assumed by the header platform during vibration of this fixture.

In use of the fixtures and vibratory apparatus shown in FIGS. 3 and 4, a supply of platforms 24 are randomly placed on the table top 41. The vibratory unit 51 is actuated to advance the platforms 24 in a clockwise direction around the surface of the table top 41. A bar 52 radiates from the hub 49 and is juxtaposed to the surface of the table top 41 to provide means for accumulating platforms 24 that are not loaded into the fixtures 31. As the platforms 24 advance, certain of them will drop into the recesses 37 with the cup-shaped portions 27 in a down position in the manner shown in FIG. 6. Due to the vibrations imparted to the platforms 24, they will rotate within the recesses 27 until the projections 29 fall within the notches 39.

Figure 7:
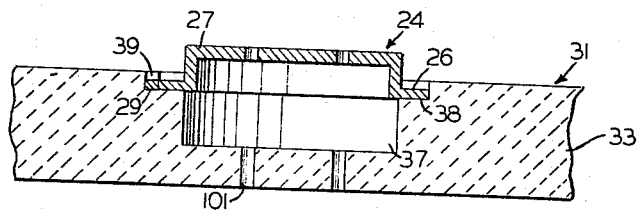

Certain of the platforms 24 will fall so that the flanges 26 rest on the shelves 38 to hold the projecting portion 27 from within the recesses 37 in the manner illustrated in FIG. 7. In such a situation, the center of gravity of the platforms 24 is above the plane of the top surface of the fixture 31 and subsequent vibrations will jar these platforms from the recess shelves 38 and advance them around the table top 41 until they engage the bar 52. The accumulated improperly positioned platforms are manually picked up and again placed on the table top 41 to again rotate about the table.

Upon loading of the platforms 24 into the ceramic fixtures 31, a supply of clear glass preforms 22 are positioned on the table top 41 to the left of the bar 52. The vibratory unit 51 is again actuated so that the preforms 22 progress in a clockwise direction about the table top 41. The preforms are of diameters slightly smaller than the inner diameters of the cup-shaped portions 27 of the platforms 24. The glass preforms thus will drop into the cup-shaped portions 27.

Referring again to FIG. 5 and particularly the upper portion thereof, there is shown a second metallic fixture 61 which comprises an upper plate 62 having a plurality of holes 63 having flared upper extremities to facilitate the loading of bundles of wires 21. Positioned below the plate 62 is a second plate 64 having a plurality of arrays of holes 66 corresponding to the geometric patterns of the holes 28 formed in the cup-shaped portions 27 of the platforms 24. A spacer plate 67 having passageways 68 is mounted to the underside of the second plate 64. Plates 62, 64 and 67 are secured together by screws 69.

The assembled plates 62, 64 and 67 are mounted on a slide plate 71 having a plurality of arrays of holes 72 corresponding to the geometrical pattern of the holes 66. A locator bar 73 is fastened to one edge of the plate 71 and a stop bar 74 is fastened to the opposite edge. Stop bar 74 provides a support for a plurality of spring loaded plungers 76 (see also FIGS. 9, 10 and 11), which act against the spacer plate 67. Pivotally mounted on a ledge 77, projecting from the plate 71, is a lever 78 which is pivotally connected through a link 79 to the plate 64. Upon actuation of the lever 78, the plates 62, 64 and 67 are moved toward the left against the action of the spring loaded plungers 76. A lock rod 81 can then be dropped through apertures 84 formed in the plates 62, 64 and 67 into an aperture 86 formed in the plate 71. In this position the arrays of holes 66 formed in the plate 64 are aligned with the arrays of holes 72 formed in the plate 71.

Referring now to FIG. 8, there is shown a vibratory unit 91 similar to vibratory unit 51. Attached to springs (not shown) contained within the vibratory unit 91 is a cross frame 92 providing a support for two sets of assembled fixtures 31 and 61. More particularly, locating plate 93 and two sets of locating bars 94 and 96 form an opening to receive a fixture 31 loaded with platforms 24 and glass preforms 22. A pivotally mounted gate 97 is provided to hold the fixtures within the opening. A lock pin 98 holds gate 97 against the fixture 31 and a depending bar 99 of the plate 71 of the fixture 61. Wing bolts 100 are provided to securely hold the fixture 31 in the frame 92.

Figure 9:
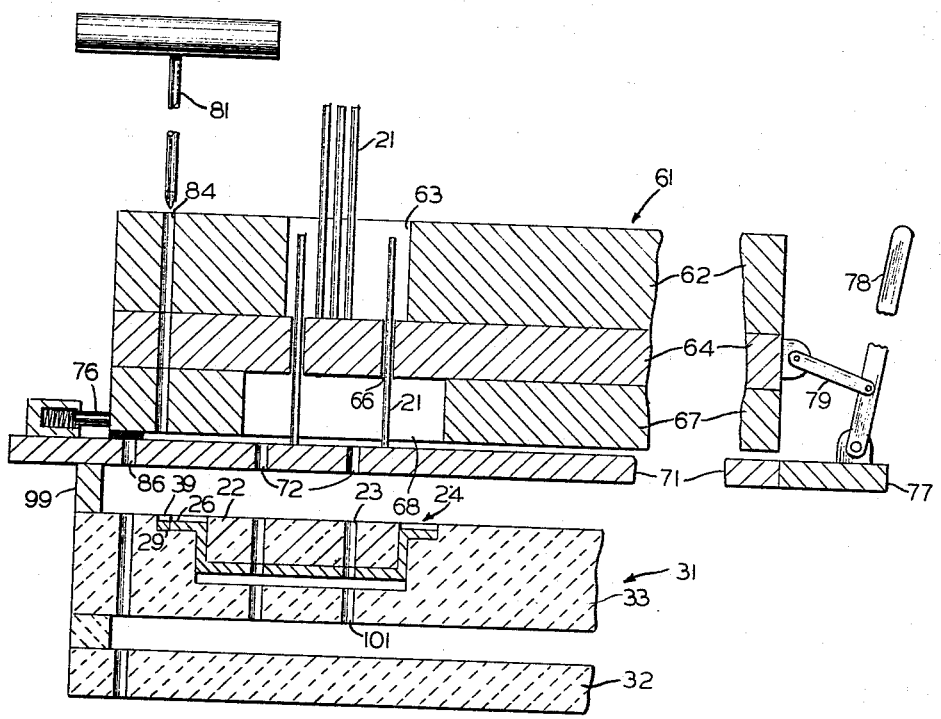
FIG. 9 depicts a showing of the loaded fixtures in assembled relation prior to subjection to vibration.

In practice of the method and considering the operation of the apparatus, the platforms 24 and the preforms 22 are loaded in the fixture 31 by the apparatus shown in FIGS. 3 and 4. The fixture 61 is placed on top of the fixture 31, as shown in FIG. 9, and a pair of assembled fixtures are loaded on the frame 92. The gates 97 are closed and locked by actuation of the thumb bolts 98. The wing bolts 100 are tightened. Bundles of wires 21 are loaded in the flared holes 63 formed in the plate 62. If a wire 21 drops through a hole 66 formed in the plate 64, it will pass through the aligned hole 68 and be retained on the upper surface of the slide plate 71 because the holes 72 in the plate 71 are not aligned with the holes 66 (see FIG. 9).

Figure 10:
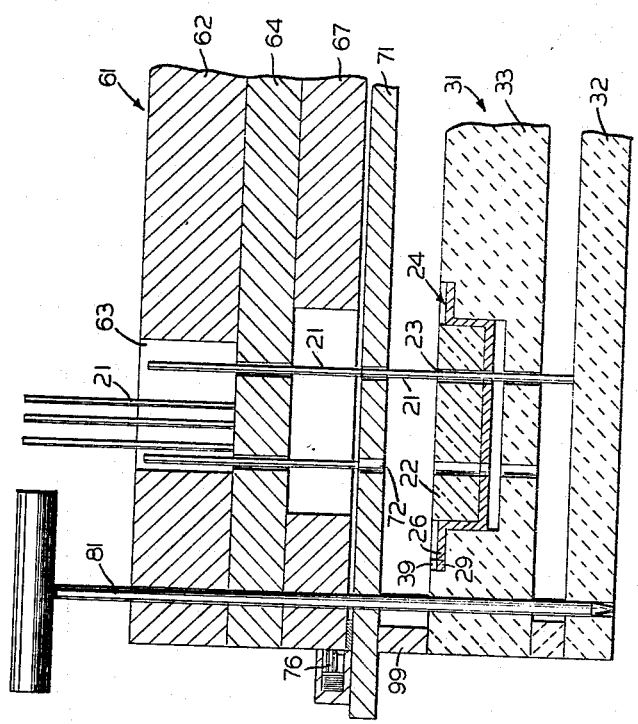
FIG. 10 is similar to FIG. 9 and shows the fixtures and components during a period in which the fixtures are subjected to vibrations.

Considering now the method and operation with respect to only one set of fixtures 31 and 61, the actuation of the lever 78 shifts the plates 62, 64 and 67 to the left, as viewed in FIG. 10. The holes 66 and 72 are now aligned with the holes 28 formed in the platform 24. In this instance the apertures 23, formed in the preform 22, will not be in alignment with the apertures 28; thus, if one wire passed through the holes 66 and 72, it will be retained by the top surface of the preform 22. It will be noted that the preform 22 is provided with an array of four apertures 23, arranged at the corners of a square, and any adjacent three of which will be in a same geometric pattern as the pattern of the apertures 28. In actuality, it has been found that when the fixtures 31 and 61 are loaded on the frame 92 and the wires 21 are placed in the holes 63, none of the wires will drop.

The vibrating unit 91 is now operated to impart vibrations to the frame 92, which will tend to thrust parts in a clockwise direction about the frame 92. These vibrations will rotate the bundles of wires 21 within the holes 63 until the wires drop through the aligned apertures 66 and 72 onto the upper surfaces of the preforms 22 (see FIG. 10). These vibrations will also be effective to rotate the preforms 22 within the cup-shaped portions 27 of the platforms 24. The apertures 23 in the preforms 22 will move into alignment with the now engaged wires 21, whereupon the wires will drop through the holes 23 into the holes 28 formed in the platform 24. Inasmuch as the preform 22 has four apertures and the platform 24 only has three apertures, one of the apertures will not receive a wire. It will be noted that the ceramic plate 33 is provided with holes 101 which allow the passed wires 21 to move into engagement with the lower ceramic plate 32.

Figure 11:
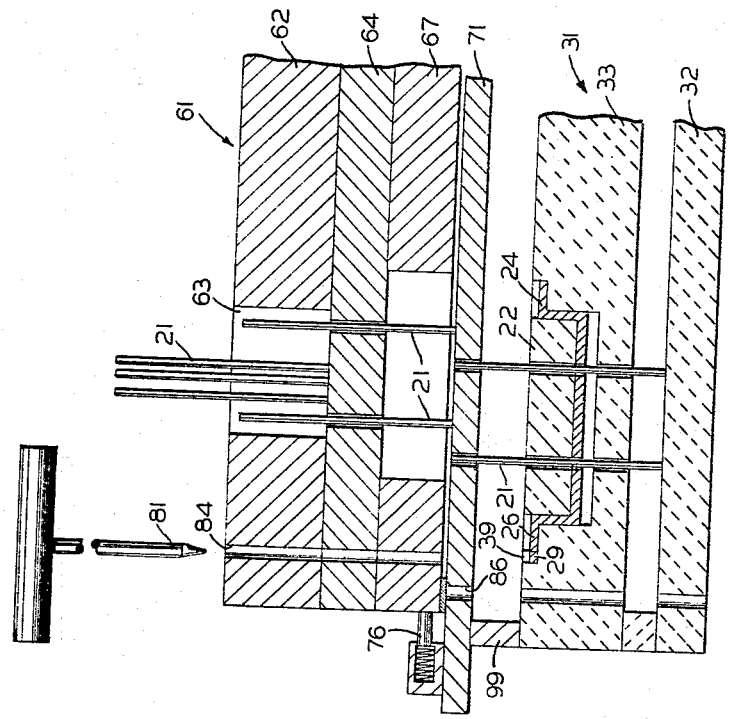
FIG. 11 is similar to FIGS. 9 and 10 and illustrates the relative positions of the fixtures and components following an assembling operation.

The lock rod 81 is now removed allowing the spring-urged plungers 86 to act on and move the plates 62, 64 and 67 relative to the slide plate 71 (see FIG. 11). This action prevents any wires 21 from dropping through the fixture 61 when this fixture is removed from the fixture 31. The gates 97 are opened, whereafter the fixture 61 is removed from the fixture 31. Each platform 24 now has a glass preform 22 mounted therein and three wires extending through both the glass preform and the platform.

The ceramic fixtures 31 are now placed on a conveyor 102 (see FIG. 12) and are advanced into a furnace 103. The furnace 103 contains a suitable heating unit 104 which will produce sufficient heat to fuse the glass preforms 22 and bond the wires 21 to platforms 24 in a manner illustrated in FIG. 2.

It is to be understood that the above-described methods and arrangements of apparatus are simply illustrative of an application of the principles of the invention and many other modifications may be made without departing from the invention.

What is claimed is:
1. A method of assembling three lead wires through a disc having four apertures and a cup-shaped platform having three apertures, which comprises the steps of
   loading the platform in a recess formed in a first plate with the cup-shaped portion in a down position,
   placing a disc within the cup-shaped platform, said disc being of a diameter slightly smaller than the cup-shaped portion of the platform,
   placing the ends of a plurality of lead wires in abutting engagement with a second plate having an array of holes corresponding to the array of apertures formed in the platform,
   vibrating the platform, disc and lead wires to move the abutting ends of the lead wires over the engaged face of the second plate to advance three of the lead wires through the holes formed in the second plate,
   holding the platform from rotation about its axis whereupon the disc is rotated about its axis relative to the platform until three of the apertures therein are aligned with the wires projecting through the second plate whereby said projecting wires pass through three of the disc apertures and through the apertures formed in the platform.

2. A method of assembling three wires through a glass disc having four apertures and through a platform having three apertures formed in a cup-shaped portion that terminates in a flange which comprises
   vibrating the platform to move over a first fixture having recesses terminating in a circumferential shelf, until said cup-shaped portion drops within a recess and the flange rests upon a shelf,
   engaging a portion of the flange to prevent rotation of the platform within the recess,
   vibrating a plurality of discs to move over said first fixture whereupon one of said discs drops within said cup-shaped portion,
   loading a bundle of wires in a hole formed in a second fixture which hole terminates in three passageways arrayed in accordance with the array of apertures formed in said cup-shaped portion,
   placing the second fixture on the first fixture to align the holes with the apertures in said platform,
   vibrating the second fixture to move said wires about the holes and three of said wires through the passageways into engagement with said disc,
   simultaneously vibrating said second fixture to rotate said disc to move three of the apertures formed therein into register with the array of three wires in said passageways whereupon said three wires move through apertures in the disc and through the apertures in the platform, and then
   fusing said glass to bond said wires to said platform.

3. A method of assembling wires through geometrically similar arrays of holes formed in and spaced about a center in a recessed semiconductor header platform and in a glass preform, wherein the number of holes in the preform is greater than the number of holes in the header platform, which comprises:
   holding said platform stationary;
   placing said preform in the recess of said platform;
   vibrating the preform to orbit the array of holes therein about said center and over the holes in the platform to align a hole in the preform with each of the holes in the platform;
   supporting a bundle of wires with the ends abutting a plate having an array of holes corresponding in geometrical pattern and number to the geometrical pattern and number of holes in the platform; and
   vibrating said bundle of wires to move and orbit the wires about said center and over the plate to move an array of wires through the holes in said plate, through aligned holes in the orbited preform and into the holes in the platform.

4. An apparatus for assembling a wire to pass through a pair of apertured parts, which comprises
   means for mounting a first of said parts against movement while permitting said second part to move relative to said first part,
   means for supporting a bundle of wires over said mounting means,
   said supporting means having a passageway extending therethrough in alignment with an aperture in the first part positioned on said mounting means, and
   means for simultaneously vibrating said mounting means and said supporting means to rotate said second part on said first part and advance a wire through the passageway into engagement with said second part whereafter continued rotation of said second part moves the aperture therein into alignment with the wire and the wire advances through the apertures in said first and second parts.

5. An apparatus for assembling three lead wires through a disc having four apertures and through a cup-shaped platform having three holes and a projection, which comprises
   a plate having a recess formed therein to receive the cup-shaped portion of said platform with the disc loaded in said cup-shaped portion,
   said recess being provided with a notch to receive said projection to prevent rotation of said platform, while said disc is free to rotate within said cup-shaped portion,
   a second plate mounted over said first plate having an array of three holes corresponding to the array of three holes formed in said platform,
   a third plate mounted on said second plate having a single hole spanning said three holes in said second plate for receiving a multitude of lead wires and abutting the ends thereof against the second plate, and
   means for imparting vibrations to all of said plates to rotate a disc within the cup-shaped portion of the platform and move said ends of said lead wires over said three holes in said second plate whereby three of said wires will be vibrated through said three holes in said second plate, through three of the holes in the disc thereby preventing further rotation of the disc, and through said three holes formed in the platform.

6. An apparatus for locating a wire through first and second apertured parts which comprises,
   a first plate having a recess formed therein to receive the first apertured part, the second apertured part being loaded within the first apertured part,
   said recess being provided with means for preventing rotation of said first apertured part while said second apertured part is free to rotate within said first apertured part,
   a second plate having a relatively large opening for receiving a plurality of wires therein and a relatively small opening extending from the large opening through said second plate and capable of receiving a single wire therethrough,
   a third plate intermediate the first and second plates and having an opening extending therethrough of substantially the same diameter as said relatively smaller opening,
   means for providing relative movement between said second and third plates in one direction for aligning said third plate opening with the relatively smaller opening in the second plate for permitting a wire to pass therethrough and into engagement with said second apertured part, and in another direction for causing a misalignment of said third plate opening with the relatively smaller opening of the second plate for blocking the passage of a wire therethrough, and
   means for imparting vibratory movement to the plates to cause a wire to pass from the relatively large opening through the relatively smaller openings of the second and third plates, and through the apertured parts when the openings of all the plates are in axial alignment.

7. Apparatus in accordance with claim 9 in which said third plate is spaced from said second plate a sufficient distance to permit the top end portion of a wire passed through the apertured parts to extend completely through said third plate opening.

8. In an apparatus for locating a wire within a pair of apertured parts, a wire loading fixture which comprises, a top plate having a relatively large opening for receiving a plurality of wires therein and a relatively small opening extending from the relatively large opening through said top plate and capable for receiving a single wire therethrough, a base plate located beneath said top plate and having an opening extending therethrough of substantially the same diameter as said relatively small opening of the top plate, means for providing relative movement between said top and base plates in one direction for aligning said base plate opening with the relatively small opening in the top plate for permitting a wire to pass therethrough and in another direction for causing a misalignment of said base plate opening with the relatively small opening of the top plate for blocking the passage of a wire therethrough, and means for imparting vibratory movement to the wires to cause a wire to pass from the relatively large opening through the relatively small opening of the top plate and through the base plate opening when the base plate opening is aligned with the relatively small opening of the top plate.

9. An apparatus for assembling wires through geometrically similar arrays of holes formed in a plurality of parts which comprises:

means for holding a first part stationary with a second part free to rotate on said first part;

means for vibrating said second part while held on said first part to move the array of holes in said second part over the holes in said first part;

means for supporting a bundle of wires, said means including a plate having an array of holes corresponding to the array of holes in said first part; and means for vibrating said bundle of wires in said supporting means with the ends of the wires abutting said plate to move and orbit the wires over the plate to move an array of wires through the holes in said plate, through the holes in said second part and into the holes formed in said first part.

References Cited by the Examiner

UNITED STATES PATENTS

| 2,321,600 | 6/1943 | Horn | 65—42 |
| 2,334,004 | 11/1943 | Herzog | 29—155.5 |
| 2,768,431 | 10/1956 | Hughes | 29—428 |
| 3,086,681 | 4/1963 | Bower | 221—93 X |
| 3,088,299 | 5/1963 | McMahon et al. | 65—49 |
| 3,127,669 | 4/1964 | Reber et al. | 29—203 |
| 3,137,061 | 6/1964 | Lalak | 29—203 |

FOREIGN PATENTS 155,135  7/1963  U.S.S.R.

DONALL H. SYLVESTER, *Primary Examiner.*

G. R. MYERS, *Assistant Examiner.*

UNITED STATES PATENT OFFICE
CERTIFICATE OF CORRECTION

Patent No. 3,276,854                                October 4, 1966

David E. Felker et al.

It is hereby certified that error appears in the above numbered patent requiring correction and that the said Letters Patent should read as corrected below.

Column 7, line 4, for claim reference numeral "9" read -- 6 --.

Signed and sealed this 5th day of September 1967.

(SEAL)
Attest:

ERNEST W. SWIDER                                EDWARD J. BRENNER
Attesting Officer                                      Commissioner of Patents